(12) United States Patent
Airey

(10) Patent No.: US 8,115,824 B2
(45) Date of Patent: Feb. 14, 2012

(54) ACTIVE PIXEL SENSOR APPARATUS FOR USE IN A STAR TRACKER DEVICE

(75) Inventor: Stephen Philip Airey, Katwijk (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 12/812,105

(22) PCT Filed: Jan. 9, 2008

(86) PCT No.: PCT/EP2008/000109
§ 371 (c)(1),
(2), (4) Date: Sep. 30, 2010

(87) PCT Pub. No.: WO2009/086849
PCT Pub. Date: Jul. 16, 2009

(65) Prior Publication Data
US 2011/0019022 A1    Jan. 27, 2011

(51) Int. Cl.
*H04N 5/228* (2006.01)
*H04N 5/235* (2006.01)
*H04N 5/217* (2006.01)
(52) U.S. Cl. ............ 348/222.1; 348/229.1; 348/241
(58) Field of Classification Search .......... 348/135, 348/207.99, 215.1, 220.1, 221.1, 222.1, 229.1, 348/230.1, 241, 272, 294, 295, 296, 297, 348/298, 299, 300, 301
See application file for complete search history.

(56) References Cited

U.S. PATENT DOCUMENTS
| 6,204,496 | B1 | 3/2001 | Levy et al. | |
|---|---|---|---|---|
| 7,719,589 | B2 * | 5/2010 | Turchetta et al. | 348/308 |
| 2003/0095189 | A1 * | 5/2003 | Liu et al. | 348/208.4 |
| 2004/0119855 | A1 * | 6/2004 | Partain et al. | 348/243 |
| 2007/0046797 | A1 * | 3/2007 | Kakumoto | 348/294 |
| 2010/0026838 | A1 * | 2/2010 | Belenky et al. | 348/229.1 |

FOREIGN PATENT DOCUMENTS
WO   WO 2005/120046 A2   12/2005

OTHER PUBLICATIONS

International Search Report issued in International Patent Application No. PCT/EP2008/000109 on Oct. 7, 2008.
Written Opinion of the International Searching Authority issued in International Patent Application No. PCT/EP2008/000109 on Oct. 7, 2008.

* cited by examiner

*Primary Examiner* — David Ometz
*Assistant Examiner* — Peter Chon
(74) *Attorney, Agent, or Firm* — Oliff & Berridge, PLC

(57) ABSTRACT

The invention relates to an active-pixel-sensor (APS) apparatus for use in a star tracker device including an imager chip, said imager chip comprising an array of photo-diodes operating as optical pixels, and a logic circuit. The logic circuit is configured for reading out a pixel signal depending on an amount of light irradiated during a predetermined integration time and resetting the optical pixel upon termination of the predetermined integration time processing the pixel signals and to output the modified signals and for performing a non-destructive readout of the pixel signal during the integration time. In order to distinguish Single-Event-Upset (SEU) contributions to the signal from star signal contributions, it is proposed to further configure the logic circuit to detect whether or not a discontinuity has occurred in the pixel signal during the integration time, and to modify the signal depending on the result of this detection.

14 Claims, 4 Drawing Sheets

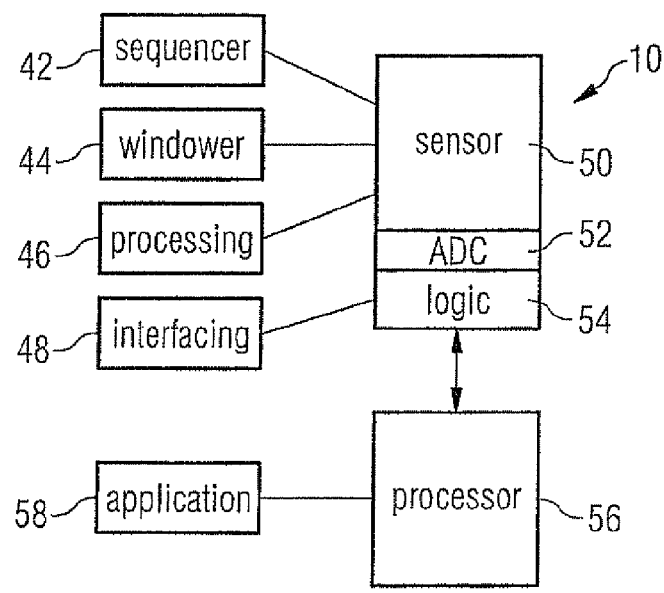
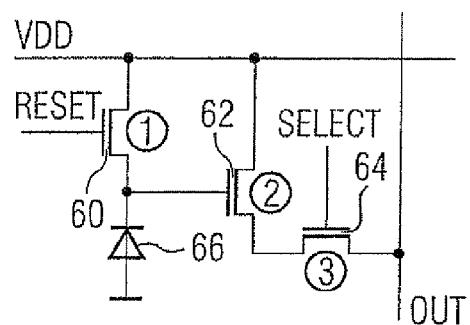
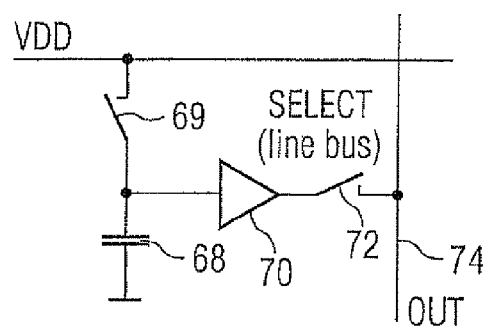

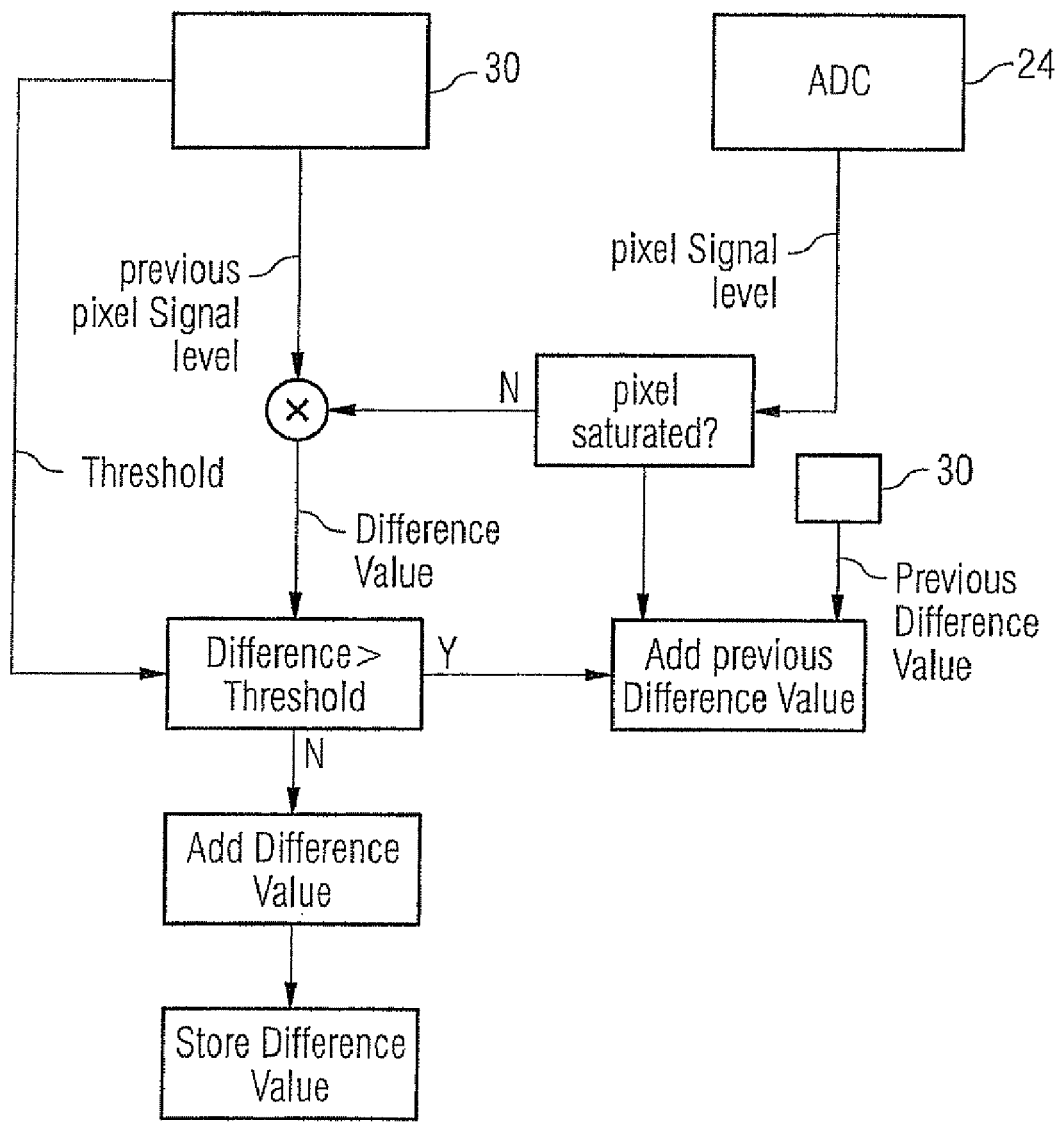

ACTIVE PIXEL SENSOR APPARATUS FOR USE IN A STAR TRACKER DEVICE

1. FIELD OF THE INVENTION

The invention relates to an active pixel sensor apparatus for use in a star tracker device according to the preamble of claim 1.

2. BACKGROUND OF THE INVENTION

Star tracker images are known to be corrupted by so-called single event upsets (SEU) appearing as points and streaks destroying the integrity of the image. The single event upsets are due to solar flares and other cosmic radiation and are particularly bothersome in missions approaching the sun.

Recently, imager chips of active pixel sensor (APS) type have been employed in star tracker apparatuses. Moreover, it has been proposed to integrate additional functionality with APS sensors in this application.

An example of such an image sensor specifically designed for star tracker applications is the so-called low cost low mass (LCMS) sensor developed by Cypress Semiconductor Corp. in collaboration with ESA. APS apparatuses of this type are provided with an on-chip logic circuit being capable of performing both a destructive readout of the optical pixels of the imager chip and a non-destructive readout of the pixels.

The core of the pixels is formed by photodiodes accumulating charge generated by irradiated photons. The destructive readout discharges the photodiodes of the pixels, whereas the non-destructive readout consists in measuring the transmissivity of a transistor whose gate voltage depends on the charge accumulated in the photodiode. As a consequence, the transistor acts as an amplifier for the pixel signal. Currently, the non-destructive read-out is used to perform a correlated double sampling which is used to minimize a fixed pattern noise (FPN) in the image signal.

Furthermore, the U.S. Pat. No. 7,145,188 B2 teaches to provide on-chip logic circuits on an imaging chip of CMOS type. It is proposed to perform a local adaptation of the pixel gain, if one or more pixels in a region are in saturation.

The object of the invention is to provide an active pixel sensor apparatus being capable of performing an on-the-fly processing of single event upsets and in particular, to enable an on-the-fly rejection of these single event upsets in order to reduce the complexity of the image processing in star tracker apparatuses.

The invention starts from an active pixel sensor apparatus for use in a star tracker device including an imager chip. The imager chip comprises an array of photodiodes operating as optical pixels. Moreover, the apparatus comprises a logic circuit being configured for reading out a pixel signal depending on an amount of light irradiated during a predetermined integration time and for resetting the optical pixel upon termination of the predetermined integration time. Moreover, the logic circuit is capable of processing the outputs of the optical pixels and to output the modified signals. Further, the logic circuit is configured for performing a non-destructive readout of the pixel signal during the integration time. In particular, the pixel may be reset and afterwards sampled and read out two or several times without additional reset in between.

One of the central points of the invention is to configure the logic circuit such that it may detect whether or not a discontinuity has occurred in the pixel signal during the integration time and to modify the signal depending on the result of this detection. The idea is based on the fact that the light of permanent light sources such as stars results in a continuous variation of the pixel signal, e.g. in a linear increase of the charge accumulated in the photodiode, whereas the single event upsets are characterized as a discontinuity in the form of a sudden jump of the signal during the integration time. The detection of the discontinuity therefore allows the identification of signals being affected by SEU and the discrimination of the different contributions to the signal, in particular the contribution of the continuous light sources from the contribution of the SEU. In order to remove the contribution of the SEU, it may be subtracted from the signal. In a further embodiment, the apparatus may be used as a lightening sensor when the modification of the signal consists in removing the continuous part instead of removing the discontinuous part.

A particularly small apparatus suitable for use in satellites can be achieved, if the logic circuit is an on-chip logic circuit provided on the imager chip.

Moreover, it is proposed that the logic circuit is further configured to periodically perform the non-destructive read-out during the integration time. This enables a quasi-continuous sampling of the signal in a discrete set of points. The discontinuity may be detected by comparing a difference between the results of subsequent non-destructive readouts with a predetermined threshold value. If the difference exceeds the threshold value, an SEU must have occurred between the last two non-destructive readout procedures.

In a preferred embodiment, the gain of the active pixels is set such that the brightest star in the field of vision of the apparatus generates a pixel signal just below the saturation value of the pixel. The threshold value should essentially correspond to the saturation value divided by the number of non-destructive readouts performed during one integration period.

In a particularly simple embodiment of the invention, the influence of the discontinuity may be removed, if the logic circuit is configured to determine an output value by repeatedly adding increments to a base value, wherein the base value may e.g. be zero. The logic circuit may then use the previously determined difference value between the results of subsequent non-destructive readouts in the same integration period as the increment, if this difference falls short of the predetermined threshold value, and use an extrapolated difference value as the increment, if the previously determined difference exceeds the predetermined threshold value.

If the logic circuit comprises storage means for storing at least one difference value, the logic circuit may determine the extrapolated difference value based on the stored difference value, e.g. by just copying the stored difference value or by performing some averaging procedure using previously determined difference values. If the extrapolated difference value is determined by averaging a certain number of stored difference values, the logic circuit may output a default value, if the actually stored number of previously determined difference values falls short of a predetermined minimum number of difference values being considered sufficient to perform the averaging.

The functionality of the logic circuit may be supplemented by a windowed read-out functionality of the image object, wherein only pixels within certain windows covering presumed positions of stars are read out in order to decrease the complexity of signal processing. Moreover, the logic circuit may perform correlated double sampling upon readout in order to avoid or reduce fixed pattern noise. Further, the logic circuit may subtract a background intensity level from the pixel signal.

In each of the above described embodiments, the active signal processing functionalities may be optional in the sense that they can be switched on and off. In order to allow for such a choice, the active pixel sensor apparatus may comprise means for activating or deactivating at least one of these signal processing functions of the logic circuit. The deactivation of unused function may result in a reduced energy consumption.

Further important features of the invention and the advantages thereof will be explained in the following description of the specific embodiment of the invention, which should be read in connection with the attached figures. The invention is not limited to the embodiment described below. The skilled person will easily find other combinations and sub-combinations of the characterizing features of the invention as defined in the appended claims.

3. BRIEF DESCRIPTION OF THE DRAWINGS

FIG. 3 is a system level diagram of the active pixel sensor imager chip according to FIGS. 1 and 2.

FIG. 4 is a transistor level diagram of a three-transistor pixel in the imager chip according to FIGS. 1 to 3.

FIG. 5 is a functional equivalent of the three-transistor pixel in FIG. 4.

FIG. 8 shows a digital domain processing flow for modifying the pixel signal depending on the result of a single event upset detection.

4. DETAILED DESCRIPTION OF AN EMBODIMENT OF THE INVENTION

Figure 1:
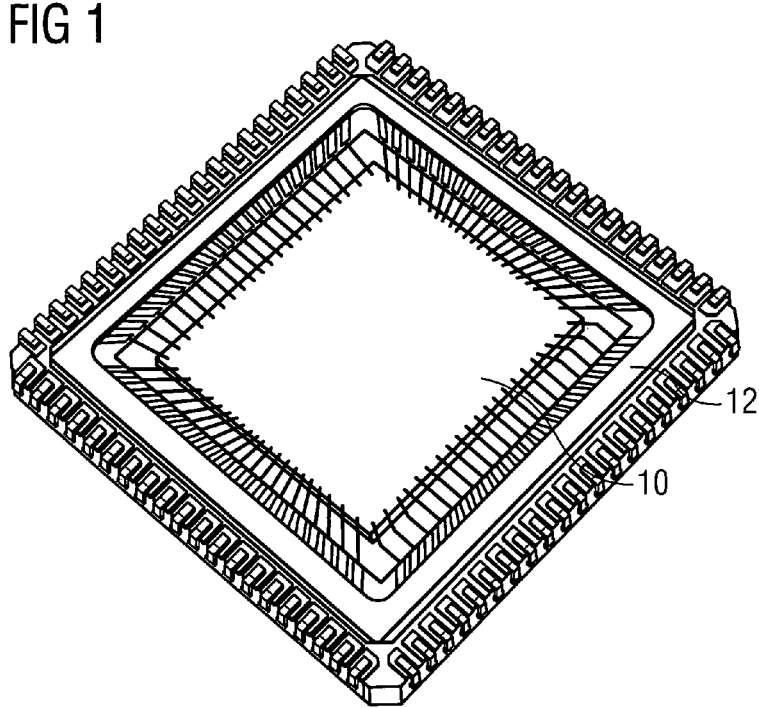
FIG. 1 shows an active pixel sensor device including an imager chip in a chip package suitable for use in a star tracker apparatus according to the invention.

FIG. 1 is an active pixel sensor device for use in a star tracker including an imager chip 10 of CMOS type. The imager chip 10 comprises an array 13 of photodiodes as optical pixels. The imager chip 10 is included in a ceramic JLCC 84 package and has an x-dimension of 15.5 mm and an y-dimension of 16.2 mm.

Figure 2:
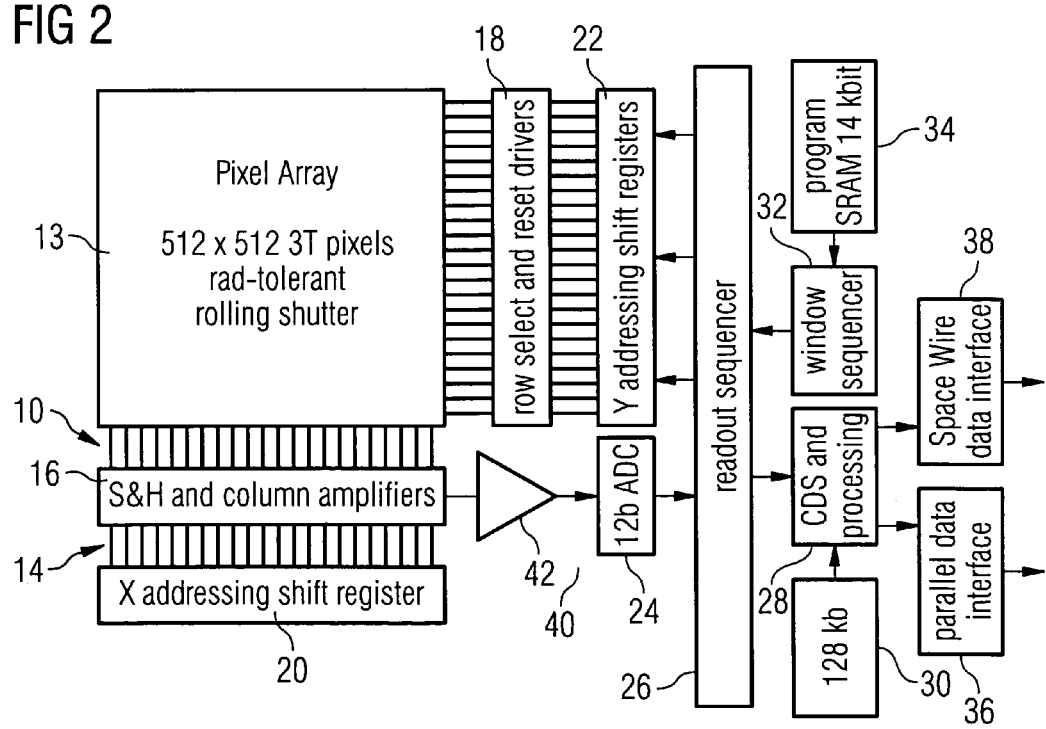
FIG. 2 is a general overview of the chip architecture of the active pixel sensor imager chip of FIG. 1.

FIG. 2 is an overall view of the chip architecture of the imager chip 10 according to FIG. 1. Besides the array of photodiodes operating as optical pixels and being arranged in a pixel array 13 of 512·512 three-transistor-pixels of CMOS type, the imager chip 10 comprises a logic circuit 14 comprising sample and hold and column amplifiers 16, row select and reset drivers 18, an x-addressing shift register 20 and an y-addressing shift register 22 and a 12-bit analogue-to-digital converter 24 (ADC). Moreover, the logic circuit 14 comprises a readout sequencer 26, a correlated double sampling and processing unit 28 with a memory unit 30, a window sequencer 32 and an SRAM memory unit 34 for storing the programme of the window sequencer 32. Finally, the imager chip 10 is provided with a parallel data interface 36 and a higher level date interface 38, e.g. for communicating in the "space wire" data format.

The above mentioned units of the imager chip 10 are arranged on a common substrate 40. The window sequencer 32 is a means for managing a window treat-out of the imager chip 10 which is controlled by external IP providing the presumed position of stars. The logic circuit 14 performs the readout of the pixels in window-type areas around these presumed positions by employing the row select and preset drivers 18, the sample and hold and column amplifiers 16 and the shift registers 20, 22.

The signals read out from the optical pixels in the pixel array 13 are amplified using an amplifier 42, converted by the analogue-to-digital converter 24, and read out by the readout sequencer 26. The signal received from the pixels depends on an amount of irradiated light during a predetermined integration time T. The integration time T is defined as the time period between subsequent reset procedures performed by the reset drivers 18.

The correlated double sampling and processing unit 28 of the logic circuit 14 is configured to perform a non-destructive readout of the pixel signal during the integration time T, wherein the pixel signal is read out twice without performing a reset between the readout procedures.

According to the invention, the logic circuit 14 is further configured for detecting whether or not a discontinuity has occurred in the pixel signal during the integration time T. According to the embodiment of FIG. 2, this configuration is realized by a suitable programme of the correlated double sampling and processing unit 28. Moreover, the processing unit 28 of the logic circuit 14 is configured for modifying the pixel signal depending on the result of this detection as described in detail below.

FIG. 3 is a system level diagram of the imager chip 10 according to the invention. The boxes on the left-hand side of FIG. 3 describe the functions implemented in the imager chip 10, namely the sequencing function 42, the windowing function 44, the processing function 46 and the interfacing function 48. The imager chip 10 can be roughly sub-divided in a sensor part 50, an analogue-to-digital converter part 52 and a logic circuit part 54 comprising the essential parts of the logic circuit 14, in particular the processing unit 28. Via the data interfaces 36, 38, the imager chip 10 communicates with a processor 56 running an application programme 58.

The imager chip 10 allows a readout of the pixel signals with 10 bit accuracy and the gain and offset of the chip analogue-to-digital converter 24 are dynamical resettable. The logic circuit 14 is capable of reading out the entire pixel array at a frame rate of 5 Hertz allowing a 200 milliseconds integration time T per pixel. In the windowed readout mode, the sensor is capable of reading out 20 windows of 20·20 pixels at a rate of 10 Hertz allowing an integration time T of 100 milliseconds per pixel. The imager chip 10 generates all required timing signals and pulses to operate and to control the pixel array 13 via simple inputs from a user including an off-chip oscillator.

The sensor supports two operation modes, in particular, full frame readout and the above described windowed readout. In the full frame readout, the exposure and the exposure start time can be specified by the user and the imager chip 10 reads out the signal of every pixel from the pixel array 13 using a rolling shutter. In the windowed readout mode, the exposure start time may be specified by the user along with up to 20 non-overlapping windows that may be selected to be 10·10, 15·15 or 20·20 pixels.

The functionality of the imager chip 10 and the logic circuit 14 is of modular design such that it is easy to disable any non-required functionality via bootstrap pins or via a user command. Disabling any functionality causes a corresponding reduction in the power consumption of the imager chip 10.

The imager chip 10 is constructed such that the dark current under zero radiation dose is less than 2,500 electrons per pixel and per second at 25° C. At the full radiation dose, the dark current is less than 5,000 electrons per pixel and per second at 25° C. The crosstalk between neighbouring pixels is less than 5% and is invariant over life. The fixed pattern noise (FPM) and the sensor reset noise (KTC) is less than 75 electrons per pixel and the pixel response non-uniformity is less 1.5% of the entire pixel array and less than 0.25% over any 5·5 sub-array of pixels. The imager chip 10 has a sensitivity which is defined as the fill factor multiplied by the quantum efficiency of greater than 40%. The spectral range of the imager chip 10 covers the wavelengths from 0.4 to 0.9 microns.

FIGS. 4 and 5 show the pixels of the pixel array 13 of the imager chip 10 in detail.

FIG. 4 is a transistor-level diagram of the pixel. Each pixel comprises three transistors 60, 62, 64 and a photodiode 66. The first transistor 60 acts as a switch 69 between the power supply and the photodiode 66. The photodiode 66 is equivalent to capacitor 68 (FIG. 5) with a light-controlled current source. The second transistor 62 can be seen as a source follower amplifier 70 (FIG. 5) buffering the voltage at the photodiode 66/capacitor 68 cathode for connection to the outside world. The third transistor 64 is a switch 72 connecting the output of the above amplifier 70 to an output signal bus 74 corresponding to the column bus of the pixel array 13.

Under every column of pixels, two capacitors (not shown) are located for sampling the reset and signal levels of the selected pixel. In non-destructive readout, both sample capacitors are used. Both capacitors contain the same signals after sampling. The readout sequence is the same as in destructive readout but only the signal coming from the signal sample capacitor 68 is used. The reset signal coming from the pixels is ignored.

Under every column of pixels sits one column amplifier 16 for writing the hold signals on the sample and hold capacitors to the output channel. In destructive readout, the reset and signal levels may be subtracted in the output amplifier 16 for cancelling most of the fixed pattern noise. In a non-destructive readout, only the signal level is used by the output amplifier 42.

When the star tracker including the active pixel sensor device according to the invention is used in an environment with a high radiation dose (e.g. in a satellite passing close to the sun and/or subject to solar flares), high energy particles are absorbed in the photodiodes resulting in a discontinuity of the pixel signal. If enough energy is absorbed in the photodiode 66, the pixel will be saturated and white spots will occur at the location of the impact of the particle of the pixel array 13. These spots disappear in the next image and the number of spots increases with the integration time. This phenomenon is known as "single event upsets" (SEU) and star tracker images are often corrupted by SEU due to solar flares.

Figure 6:
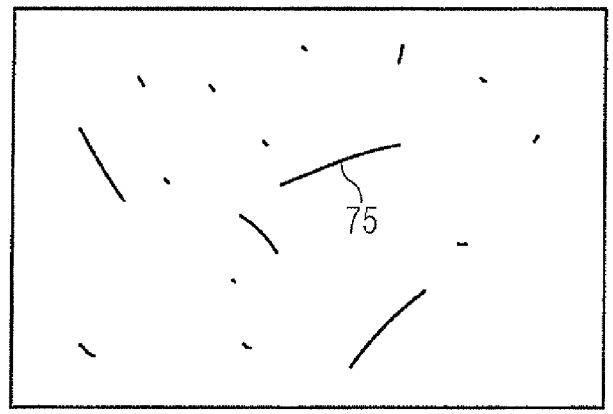
FIG. 6 is a picture with multiple single event upsets taken by an imager chip according to the prior art.

An example of a typical star tracker image including multiple SEU points and streaks 75 is shown in FIG. 6. According to the prior art, the SEU streaks are removed by software in a post processing procedure of the image. However, the post processing does not give a perfect removal and may become very complex and time-consuming.

Figure 7:
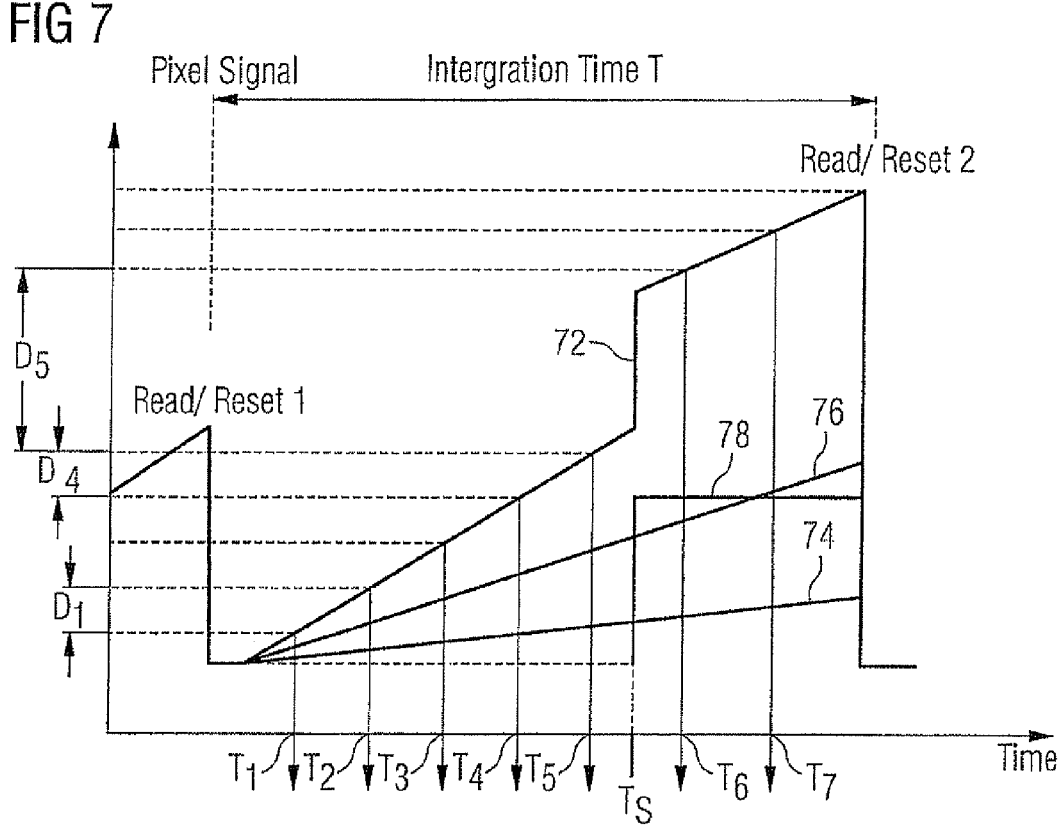
FIG. 7 is a graph showing temporal evolution of the pixel signal of the imager chip including a single event upset signal contribution.

FIG. 7 shows an example of pixel signal during the integration time T. At an intermediate time $T_S$, a radiation particle is absorbed in the photodiode 66 and generates an avalanche of charge carriers resulting in a quasi-continuous sudden jump in the pixel signal. It is noted that the expression "discontinuous" and the expression "discontinuity" shall not be construed in a narrow, mathematical sense but rather in terms of the typical temporal resolution of digital circuits. The sudden increase or decrease in the signal shall be classified as "discontinuous", if the signal changes by more than 10 to 20% of the signal amplitude within a fraction of less than 1 or 2% of the total integration time T.

FIG. 7 shows the total signal 72 as read out from the pixel together with the contribution of a dark current 74 and the contribution of the target signal 76 originating from the star to be observed. Moreover, FIG. 7 shows the contribution of the SEU signal 78 which has the form of a step function (an integrated δ function) with a discontinuity at $T_S$.

One of the central ideas of the invention is to perform non-destructive readouts in order to detect the discontinuity and to be able to subtract or otherwise compensate the SEU signal contribution 78 by a suitable modification of the signal in a signal processing procedure.

According to the preferred embodiment of the invention, the logic circuit 13 is configured to repeatedly perform non-destructive readouts at times $T_1$ to $T_7$ during the integration time T. The processing unit 28 then determines the difference between the results of subsequent non-destructive readouts, e.g. the difference $D_1$ between the readouts at $T_1$ and $T_2$ by and the difference $D_5$ between the readouts at $T_5$ and $T_6$. The differences $D_1$, $D_5$ are then compared with a predetermined threshold value corresponding e.g. to twice the maximum amplitude of the pixel signal divided by the number of non-destructive readouts during the integration period T. Moreover, the logic circuit 13 uses the temporal behaviour of the pixel signal 72 prior to the SEU at $T_S$ in order to extrapolate the undisturbed signal. If the pixel is saturated after the SEU, the readout values following the SEU may be neglected, whereas the readout can be modified by subtracting the discontinuity, if the pixel is non-saturated.

In a preferred embodiment of the invention, the logic circuit 13 is configured to determine the output signal by repeatedly adding increments to a base value, wherein the base value may be zero. If no discontinuity has been detected in the previous step, e.g. as in the step between $T_1$ and $T_2$ in FIG. 7 with the difference $D_1$ falling short of the threshold value, the difference $D_1$ may be used by the increment. However, if the difference exceeds the predetermined threshold value, as for example in the case of the step between $T_5$ and $T_6$ in FIG. 7 where the difference $D_5$ is detected, the logic circuit uses an extrapolated difference value as the increment.

In order to perform the extrapolation, the logic circuit 13 comprises the storage unit 30 storing the last few difference values. The processing unit 28 uses the stored difference values to determine the extrapolated difference value based on the stored difference values. In the simplest case, only the last difference value may be stored in the storage unit 30 as the extrapolated difference value. Basically, this corresponds to approximating the height of the discontinuity in FIG. 7 as the difference between the difference value $D_5$ and the difference value $D_4$ between the non-destructive readouts at $T_5$ and $T_4$.

In a more sophisticated embodiment of the invention, the logic circuit may determine the extrapolated difference value by averaging two or more difference values stored in the storage unit 30 and determined prior to the detection of the jump.

However, this averaging procedure can only be performed if at least a predetermined minimum number of difference values not being corrupted by an SEU are stored in a storage unit 30. As a consequence, the logic circuit 13 and the processing unit 28 may be configured to output a default value, if a number of previously stored determined difference values falls short of the predetermined minimum number such that an averaging would be impossible.

The non-destructive readouts at $T_1$ to $T_7$ are performed by determining a gate voltage of the photodiodes using the transistor 62 in FIG. 4, which acts as the source follower amplifier 70 in FIG. 5.

The above described method for extrapolating the signal employs a discretized gradient of the pixel signal which is determined in the form of the difference values prior to the discontinuity at $T_S$.

Moreover, by applying adjustable bias values for the analogue-to-digital converter 42, the background intensity level may be subtracted from the pixel signal (e.g. the dark current contribution 74 in FIG. 7).

FIG. 8 shows an example of a digital domain processing flow implemented in the processing unit 28. The processing unit 28 receives the pixel signal level from the analogue-to-digital converter ADC 24 and reads the pixel signal level from the previous non-destructive readout in the same integration interval T from the memory unit 30 and subtracts the previous signal level from the actual pixel signal level in order to determine the difference value. The difference value is compared with a threshold value read from the memory unit 30. If the difference exceeds the threshold value, the difference value is discarded and the difference value stored in the previous step is read from the memory unit 30 and added to the output value. If the difference value does not exceed the threshold value, the logical circuit concludes that no SEU has occurred in the previous step and the difference value is added to the base value and stored in the memory unit 30 for use in a later step. If the pixel signal level received from the analogue-to-digital converter 24 indicates that the pixel is saturated, the procedure immediately jumps to the step of adding the previous difference value.

The invention claimed is:

1. Active-Pixel-Sensor apparatus for use in a star tracker device, the active-pixel-sensor comprising:
    an imager chip, said imager chip configured with an array of photo-diodes configured to operate as optical pixels, and
    a logic circuit being configured for:
        reading out a pixel signal depending on an amount of light irradiated during a predetermined integration time and resetting the optical pixel upon termination of the predetermined integration time;
        processing the pixel signals and to output the modified signals; and
        periodically performing a non-destructive readout of the pixel signal during the integration time,
        wherein
        the logic circuit is further configured for:
            detecting whether or not a discontinuity has occurred in the pixel signal during the integration time, and for
            modifying the signal depending on the result of this detection; and
        wherein the logic circuit is further configured to:
            determine a difference between results of subsequent non-destructive readouts, and
            detect the discontinuity by comparing the thus determined difference with a predetermined threshold value.

2. Active-Pixel-Sensor device according to claim 1, wherein the logic circuit is an on-chip the logic circuit provided on said imager chip.

3. Active Pixel Sensor device according to claim 1, wherein the logic circuit is configured
    to determine an output signal value by repeatedly adding increments to a base value,
    to use the previously determined difference between the results of subsequent non-destructive readouts as said increment if the difference is below said predetermined threshold value and to
    use an extrapolated difference value as the increment if the previously determined difference exceeds said predetermined threshold value.

4. Active Pixel Sensor device according to claim 3,
    wherein the logic circuit comprises storage means for storing at least one difference value and to determine said extrapolated difference value based on the stored difference value.

5. Active Pixel Sensor device according to claim 3,
    wherein the logic circuit is configured to determine said extrapolated difference value by averaging at least two difference values determined prior to detection of the jump.

6. Active Pixel Sensor device according to claim 3, wherein the logic circuit is configured to output a default value of the modified signal if a number of stored previously determined difference values falls short of a predetermined minimum number.

7. Active Pixel Sensor device according to claim 1, wherein said photo-diodes are of CMOS type.

8. Active Pixel Sensor device according to claim 7, wherein the logic circuit is configured to perform said non-destructive readout by determining a gate voltage of said photo-diodes.

9. Active Pixel Sensor device according to claim 1, wherein the logic circuit is configured to modify the pixel signal by using a gradient of the pixel signal determined prior to a jump in the pixel signal to perform an extrapolation.

10. Active Pixel Sensor device according to claim 1, further comprising means for managing a windowed readout of the imager chip.

11. Active Pixel Sensor according to claim 1, wherein the logic circuit is configured to perform correlated double sampling upon a readout of the array of photo-diodes.

12. Active Pixel Sensor according to claim 1, wherein the logic circuit is configured to calculate and subtract a background intensity level from the pixel signal.

13. Active Pixel Sensor device according to claim 1, further comprising means for activating or deactivating at least one signal processing function of the logic circuit.

14. Method for on-chip data processing in an Active-Pixel-Sensor apparatus for use in a star tracker device, the Active-Pixel-Sensor apparatus including an imager chip configured with an array of photo-diodes configured to operate as optical pixels, the method comprising the steps of:
    reading out a pixel signal depending on an amount of light irradiated during a predetermined integration time and resetting the optical pixel upon termination of the predetermined integration time;
    processing the pixel signals and to output the modified signals;
    periodically performing a non-destructive readout of the pixel signal during the integration time,
    detecting whether or not a discontinuity has occurred in the pixel signal during the integration time by determining a difference between results of subsequent non-destructive readouts, and by detecting the discontinuity by comparing the thus determined difference with a predetermined threshold value, and
    modifying the signal depending on the result of this detection.

* * * * *